United States Patent [19]

Kato

[11] Patent Number: 5,327,348
[45] Date of Patent: Jul. 5, 1994

[54] VEHICLE-DIRECTION DETECTING APPARATUS

[75] Inventor: Takahiro Kato, Kawagoe, Japan

[73] Assignee: Pioneer Electronic Corporation, Tokyo, Japan

[21] Appl. No.: 937,707

[22] Filed: Sep. 1, 1992

[30] Foreign Application Priority Data

Sep. 10, 1991 [JP] Japan ................. 3-230415

[51] Int. Cl.$^5$ ............................................. G06F 15/50
[52] U.S. Cl. ................................... 364/449; 364/454; 340/988; 33/356
[58] Field of Search ............. 364/443, 449, 450, 453, 364/454, 457; 73/178 R; 33/356, 357; 340/988, 955

[56] References Cited

U.S. PATENT DOCUMENTS

| | | |
|---|---|---|
| 4,734,863 | 3/1988 | Honey et al. ............. 364/449 |
| 4,887,081 | 12/1989 | Iihoshi et al. ............. 340/988 |
| 5,040,122 | 8/1991 | Neukirchner et al. ....... 364/454 |
| 5,067,083 | 11/1991 | Nakayama et al. ......... 364/453 |
| 5,115,238 | 5/1992 | Shimizu et al. ............ 340/995 |
| 5,122,960 | 6/1992 | Ooka ....................... 364/453 |
| 5,235,514 | 8/1993 | Matsuzaki ................. 364/454 |
| 5,254,987 | 10/1993 | Nakatani .................. 364/449 |

FOREIGN PATENT DOCUMENTS 272078 6/1988 European Pat. Off.
0373317 6/1990 European Pat. Off.

OTHER PUBLICATIONS

English abstract of Okihiko et al Japanese laid open application No. 890049936, Mar. 1989.
English abstract of Seiki Japanese laid open application 840031388, Feb. 2, 1984.

Primary Examiner—Gary Chin
Attorney, Agent, or Firm—Cushman, Darby & Cushman

[57] ABSTRACT

A vehicle-direction detecting apparatus compensates for the direction detected by each sensor to provide a correct direction. A difference signal between the first direction signal based on the XY output signal of a geomagnetic sensor and the second direction signal acquired by integrating the output signal of an angular velocity sensor is computed, it is discriminated whether or not an absolute value signal of the difference signal is greater than a first predetermined value, it is discriminated whether or not the output signal of differentiating means which has differentiated the absolute value signal is greater than a second predetermined value, it is discriminated whether or not the XY output signal of the geomagnetic sensor has a value within a predetermined range, and the first or second direction signal is compensated for in accordance with the results of the above discriminations. Even if the declination or the magnetic center point varies, or the offset of the angular velocity sensor varies, the direction detected by each sensor will be compensated accordingly.

4 Claims, 3 Drawing Sheets

VEHICLE-DIRECTION DETECTING APPARATUS

BACKGROUND OF THE INVENTION

1. Field of the Invention

The present invention relates to a vehicle-direction detecting apparatus using a geomagnetic sensor and an angular velocity sensor.

2. Description of Background Information

In an on-vehicle navigation system, running direction of the vehicle is detected by a direction detecting apparatus for later display of that direction. In order to detect the direction, the direction detecting apparatus uses a geomagnetic sensor for detecting the intensity of geomagnetism in the X and Y directions perpendicular to each other on the same plane where the vehicle lies, as well as an angular velocity sensor for detecting the angular velocity of the vehicle. The direction detecting apparatus using those sensors has, however, been unable to detect the direction of the vehicle correctly, resulting in abnormal detection, because the geomagnetic sensor is affected by the magnetization of the steel plate of the vehicle body or the declination or the angle difference between the north on a map (true north) and the north indicated by the geomagnetism (compass north), and because the angular velocity sensor cannot detect other than the relative direction and its performance varies with the time. Therefore, there is a demand that the direction detected by the sensors in such an abnormal state be compensated to provide the correct direction.

OBJECTS AND SUMMARY OF THE INVENTION

It is therefore an object of the present invention to provide a vehicle-direction detecting apparatus using a geomagnetic sensor and an angular velocity sensor, which can discriminate a detection error when it has occurred to compensate for an inaccurate sensor detected direction, thereby providing the accurate direction.

The vehicle-direction detecting apparatus according to the present invention comprises a geomagnetic sensor for detecting an intensity of geomagnetism in X and Y directions perpendicular to each other on the same plane where a vehicle lies; a computation circuit for computing a first direction signal in accordance with an XY output signal from the geomagnetic sensor and outputting the first direction signal; an angular velocity sensor for detecting an angular velocity of the vehicle; an integrator for integrating an output signal of the angular velocity sensor to yield a second direction signal; means for computing a difference signal between the first direction signal and the second direction signal; means for generating an absolute value signal of the difference signal; first discriminating means for discriminating whether or not the absolute value signal is greater than a first predetermined value; a differentiating means for differentiating the absolute value signal; second discriminating means for discriminating whether or not an output signal of the differentiating means is greater than a second predetermined value; third discriminating means for discriminating whether or not the XY output signal of the geomagnetic sensor has a value within a predetermined range; and compensation means for compensating for the first or second direction signal in accordance with discrimination results from the first to third discriminating means.

In the vehicle-direction detecting apparatus of the present invention, a difference signal between the first direction signal based on the XY output signal of the geomagnetic sensor and the second direction signal acquired by integrating the output signal of the angular velocity sensor is computed, it is discriminated by the first discriminating means whether or not the absolute value signal of the difference signal is greater than a first predetermined value, it is discriminated by the second discriminating means whether or not the output signal of the differentiating means which has differentiated the absolute value signal is greater than a second predetermined value, it is discriminated by the third discriminating means whether or not the XY output signal of the geomagnetic sensor has a value within a predetermined range, and the first or second direction signal is compensated for in accordance with the discrimination results from the first to third discriminating means.

DETAILED DESCRIPTION OF THE PREFERRED EMBODIMENTS

Preferred embodiments of the present invention will now be described in detail referring to the accompanying drawings.

Figure 1:
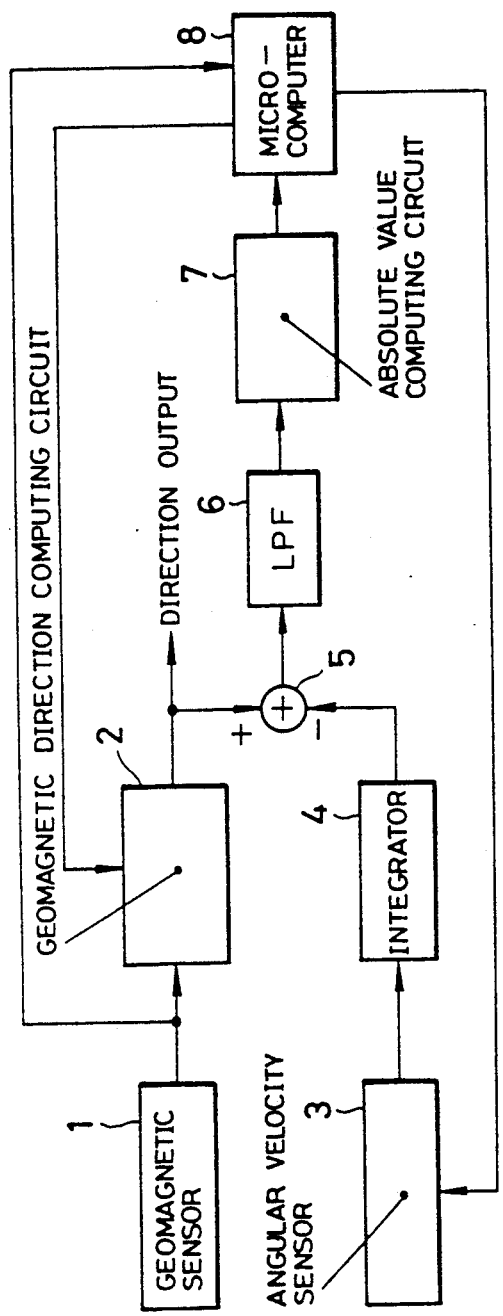
FIG. 1 is a block diagram illustrating a vehicle-direction detecting apparatus according to one embodiment of the present invention.

FIG. 1 shows a vehicle-direction detecting apparatus embodying the present invention. This direction detecting apparatus is provided with two sensors: a geomagnetic sensor 1 that detects the geomagnetism at the vehicle position as X and Y components, and an angular velocity sensor 3 that detects the angular velocity of that vehicle. The geomagnetic sensor 1 has a pair of magnetism detecting elements arranged on the same plane at a phase angle of 90° therebetween, one of the elements detecting the geomagnetic component in the X (eastward) direction and the other detecting the geomagnetic component in the Y (northward) direction. The output of the geomagnetic sensor 1 is connected to a geomagnetic direction computing circuit 2, which computes a geomagnetic direction signal $\theta1$ as a first direction signal from the X and Y component signals output from the geomagnetic sensor 1. The output of the angular velocity sensor 3 is connected to an integrator 4. The integrator 4 integrates an angular velocity signal $\omega$ output from the angular velocity sensor 3 and outputs an angular velocity direction signal $\theta2$ as a second direction signal. The outputs of the geomagnetic direction computing circuit 2 and the integrator 4 are both connected to a subtracter 5 which computes the difference between the output direction signal $\theta1$ of the geomagnetic direction computing circuit 2 and the output direction signal $\theta2$ of the integrator 4. The output of the subtracter 5 is connected via a low-pass filter 6 to an absolute value computing circuit 7. The low-pass filter 6 eliminates geomagnetic disturbance components from the output signal of the subtracter 5. The output of the absolute value computing circuit 7 is connected to a microcomputer 8. The microcomputer 8, which comprises a CPU, a RAM, a ROM and an input/output (I/O) interface (not shown), operates in accordance with a program written in advance in the ROM. The I/O interface of the microcomputer 8 is supplied with the absolute value signal from the absolute value computing circuit 7 and the X and Y component signals from the geomagnetic sensor 1. The signal level of the geomagnetic direction signal $\theta 1$ represents the direction $\theta 1$, and the signal level of the angular velocity direction signal $\theta 2$ represents the direction $\theta 2$.

As the geomagnetic sensor 1 makes one revolution on a horizontal plane, the locus of a circle or a magnetic circle will be drawn on the X and Y coordinates by the output values of the X and Y magnetism detecting elements. Given that the center point of the circular locus is (x0, y0) and the X and Y component signals output from the geomagnetic sensor 1 represent XY coordinate data (x, y), the direction $\theta$ can be expressed as follows:

$$\theta = \tan^{-1} \frac{y - y0}{x - x0} \quad (1)$$

The center point data (x0, y0) of the circular locus is computed by the microcomputer 8 and is sent to the geomagnetic direction computing circuit 2.

When the geomagnetic sensor 1 is installed in a vehicle, however, the detection is affected by the length of the vehicle body as well as the magnetization of the steel plate of the body. Since the body of an automobile has a shape of a rectangle longer in the fore-and-aft direction, the projection density of the vertical plane of a magnetizable material such as a steel plate in the fore-and-aft direction of the body differs from that in the crosswise direction of the body. Even with the body evenly magnetized, therefore, the detection sensitivities of the X and Y magnetism detecting elements arranged orthogonal to each other differ from each other. Thus, when a vehicle having the geomagnetic sensor 1 installed therein makes one turn to draw a circle, the locus of the output values of the geomagnetic sensor will be elliptic, for example. When an ellipticity k (=Rx/Ry) is used to compensate for the output value (x, y) of the geomagnetic sensor 1, the output value becomes will be (x, ky−ky0 +y0) so that the elliptic locus may be compensated to be the locus of a complete round. This ellipsis compensation is executed in the geomagnetic direction computing circuit 2.

The angle difference between the north on a map (true north) and the north acquired by geomagnetism (compass north) is called "declination". This declination occurs due to the difference between the poles of the earth and the magnetic poles. For instance, the declination in the Kanto area is $-6°$ (indicating the compass north is deviated westward by 6° from the true north), and the declination in the San Francisco area is $+15°$ (indicating the compass north is deviated eastward by 15° from the true north). It is therefore necessary to compensate for the declination in order to acquire the accurate direction using the geomagnetic sensor 1 that measures the geomagnetism. Further, when the geomagnetic sensor 1 is installed in the vehicle, an installation error is inevitable. Furthermore, the declination may temporarily vary on elevated bridges, expressways or the like due to the influence by their construction. A declination compensation value $\theta 0$ is a value for compensating for the declination, reflecting that error too. Using the ellipticity k and the declination compensation value $\theta 0$, therefore, the direction 01 of the vehicle is expressed as:

$$\theta 1 = \tan^{-1} \frac{k(y - y0)}{x - x0} - \theta 0 \quad (2)$$

The geomagnetic direction computing circuit 2 performs an analog operation shown in the equation (2) to acquire the geomagnetic direction signal $\theta 1$.

The angular velocity signal $\omega$ output from the angular velocity sensor 3 is integrated by the integrator 4 to be the angular velocity direction signal $\theta 2$. The subtracter 5 subtracts the output direction signal $\theta 2$ of the integrator 4 from the direction signal $\theta 1$ and outputs the difference signal $\theta 1 - \theta 2$. This difference signal $81 - \theta 2$ is removed of its high-frequency noise component by the low-pass filter 6 and is subsequently sent to the absolute value computing circuit 7. The computing circuit 7 computes an absolute value $|\theta 1 - \theta 2|$ and outputs it as an absolute value signal to the microcomputer 8. The level of the absolute value signal indicates the absolute value $|\theta 1 - \theta 2|$.

Figure 2:
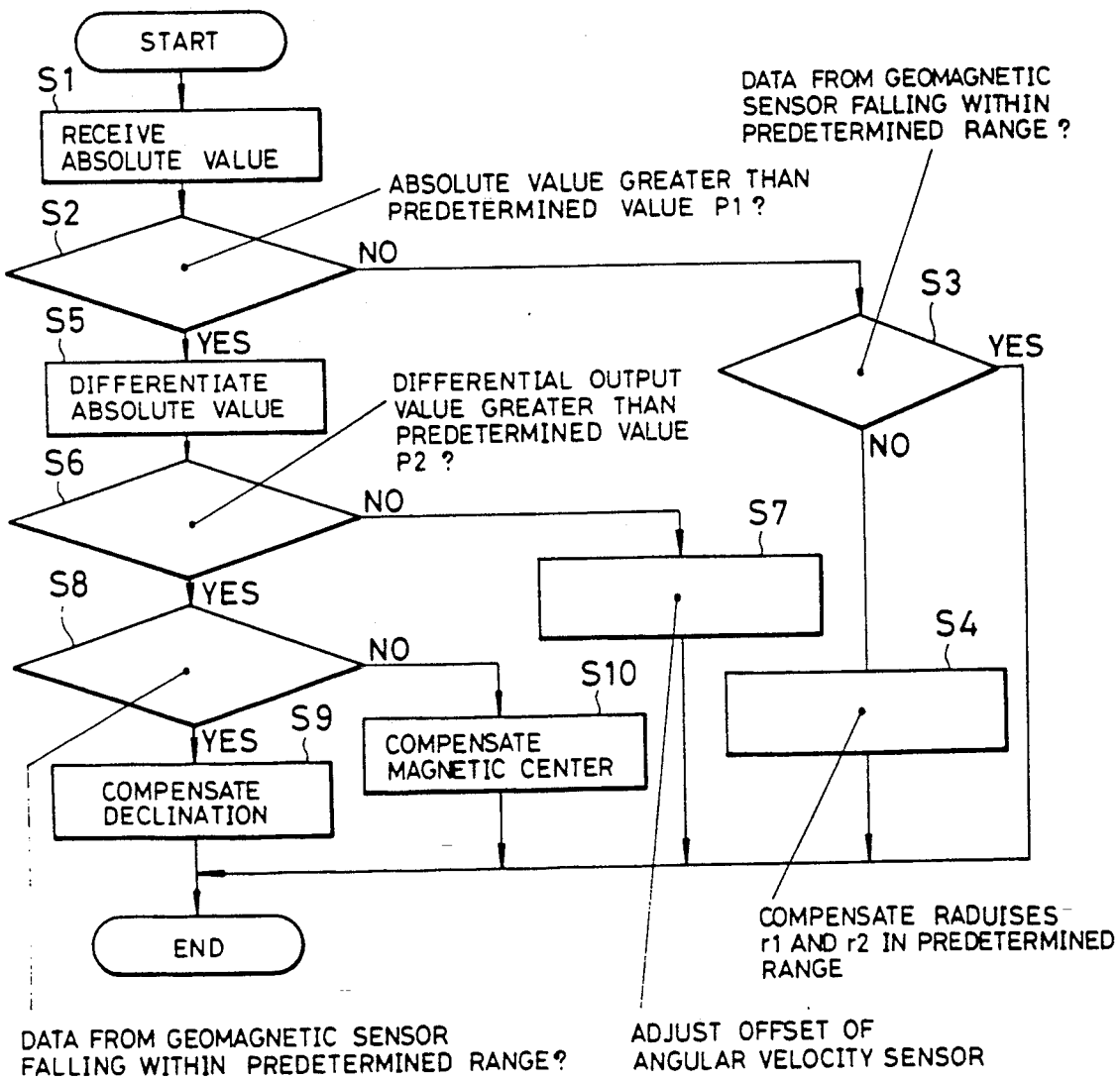
FIG. 2 is a flowchart illustrating the operation of a microcomputer incorporated in the direction detecting apparatus in FIG. 1.

As illustrated in FIG. 2, for each predetermined cycle, the CPU of the microcomputer 8 first receives the absolute value signal (step S1), and then discriminates whether or not the absolute value $|1 - \theta 2|$ is greater than a predetermined value P1 (step S2). If the absolute value $|1 - \theta 2|$ is equal to or smaller than the predetermined value P1, the CPU discriminates whether or not the XY coordinate data (x, y), the output value of the geomagnetic sensor 1, falls within a range of radiuses R1 and R2 (R1<R2) from a center point (x0, y0) (step S3). When the XY coordinate data (x, y) falls within that range, the direction detection is accurate so that this routine will be terminated. When the XY coordinate data (x, y) falls outside that range, the intensity of the detected geomagnetism is weak, for example, at the point and the radiuses R1 and R2 are compensated (step S4). For example, the radiuses R1 and R2 are decreased by a predetermined value $\Delta$.

If the absolute value $|\theta 1 - \theta 2|$ is greater than the predetermined value P1 in step S2, the absolute value is differentiated to yield a differential output value (step S5), and it is then discriminated whether or not the differential output value is greater than a predetermined value P2 (step S6). The magnitude of change in declination is large when such a change is caused by direction change due to the magnetization of the vehicle body or by disturbance during the drive, etc.; while the change in direction caused by drifting of the angular velocity sensor is of small magnitude. Using the difference in the degree of changes, if the differential output value is equal to or smaller than the predetermined value P2, it is considered that the directional detection output of the angular velocity sensor 3 is abnormal and an offset adjustment for the angular velocity sensor 3 is performed (step S7). That is, the CPU of the microcomputer 8 generates an offset adjustment command to the angular velocity sensor 3. If the differential output value is greater than the predetermined value P2, it is considered that the directional detection output of the geomagnetic sensor 1 is abnormal and it is then discriminated whether or not the XY coordinate data (x, y), the output value of the geomagnetic sensor 1, falls within the range of the radiuses R1 and R2 (R1<R2) from the center point (x0, y0) (step S8). This discrimination is the same as the one made in step S3. When the XY coordinate data (x, y) falls within that range, it is considered that the declination has changed and the declination is compensated accordingly (step S9). More specifically, the CPU of the microcomputer 8 issues to the geomagnetic direction computing circuit 2 a command to change the declination compensation value $\theta 0$ by a predetermine value $\Delta/\theta$. When the XY coordinate data (x, y) falls outside that range, by which it is considered that the magnetic center point (x0, y0) is in error due to a change in the magnetization of the vehicle's body, the operation of electric parts installed in the vehicle, etc., the center point (x0, y0) is compensated (step S10).

Figure 3:
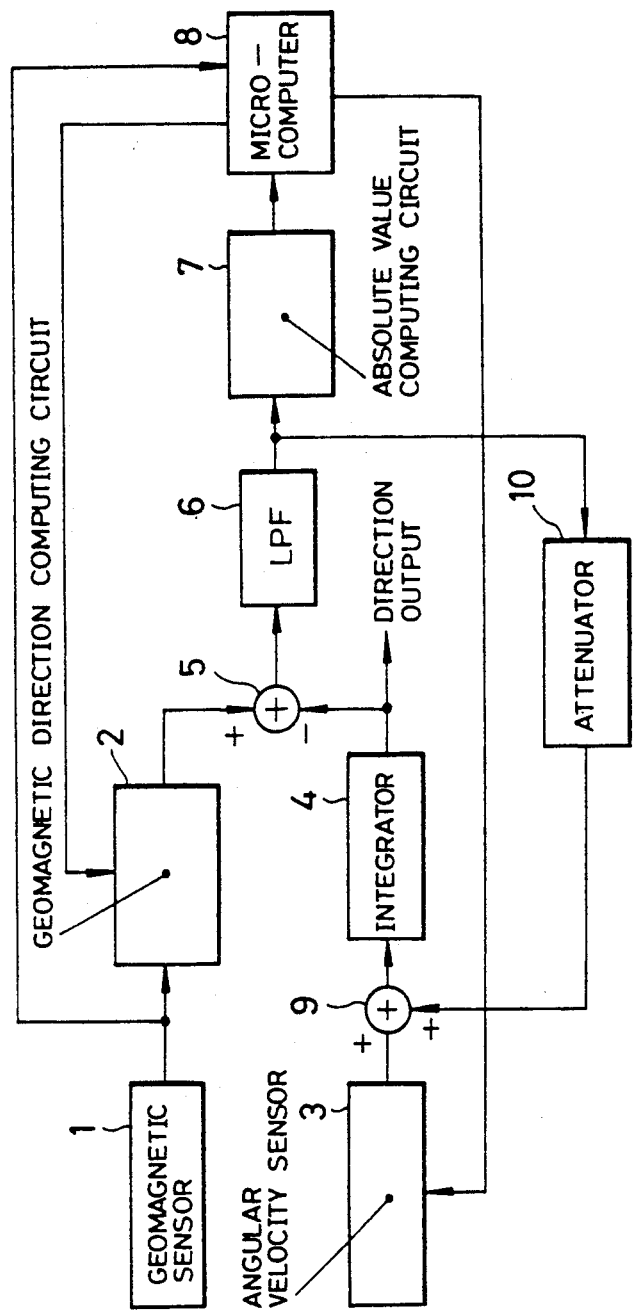
FIG. 3 is a block diagram illustrating a vehicle-direction detecting apparatus according to another embodiment of the present invention.

The structure of the direction detecting apparatus may be modified as shown in FIG. 3, in which an adder 9 is inserted between the angular velocity sensor 3 and the integrator 4, the output signal of the low-pass filter 6 is supplied via an attenuator 10 to the adder 9 where the output signal of the angular velocity sensor 3 is added to the output signal of the attenuator 10, and the resultant signal is supplied to the integrator 4. According to this modification, the direction $\theta 2$ acquired by integrating the angular velocity signal by the integrator 4 gradually converges to the direction $\theta 1$ so that the direction output can be obtained from the integrator 4.

According to the present invention, a difference signal between the first direction signal based on the XY output signal of the geomagnetic sensor and the second direction signal acquired by integrating the output signal of the angular velocity sensor is computed, it is discriminated by the first discriminating means whether or not the absolute value signal of the difference signal is greater than a first predetermined value, it is discriminated by the second discriminating means whether or not the output signal of the differentiating means which has differentiated the absolute value signal is greater than a second predetermined value, it is discriminated by the third discriminating means whether or not the XY output signal of the geomagnetic sensor has a value within a predetermined range, and the first or second direction signal is compensated for in accordance with the discrimination results from the first to third discriminating means. Even if the declination or the magnetic center point varies, or the offset of the angular velocity sensor varies, therefore, the accurate direction can always be obtained because the detection direction of the sensor will be compensated for according to such variations.

What is claimed is:

1. A vehicle-direction detecting apparatus comprising:

a geomagnetic sensor for detecting an intensity of geomagnetism in X and Y directions perpendicular to each other on the same plane where a vehicle lies;

computation means for computing a first direction signal in accordance with an XY output signal from said geomagnetic sensor and outputting said first direction signal;

an angular velocity sensor for detecting an angular velocity of said vehicle;

an integrator for integrating an output signal of said angular velocity sensor to yield a second direction signal;

means for computing a difference signal between said first direction signal and said second direction signal;

means for generating an absolute value signal of said difference signal;

first discriminating means for discriminating whether or not said absolute value signal is greater than a first predetermined value;

differentiating means for differentiating said absolute value signal;

second discriminating means for discriminating whether or not an output signal of said differentiating means is greater than a second predetermined value;

third discriminating means for discriminating whether or not said XY output signal of said geomagnetic sensor has a value within a predetermined range; and compensation means for compensating for said first or second direction signal in accordance with discrimination results from said first to third discriminating means.

2. The vehicle-direction detecting apparatus according to claim 1, wherein in a case where said first discriminating means discriminates that said absolute value signal is greater than said first predetermined value and said second discriminating means discriminates that said output signal of said differentiating means is greater than said second predetermined value, said compensation means performs declination compensation when said value of said XY output signal of said geomagnetic sensor is within said predetermined range and compensates for magnetic center data when said value of said XY output signal of said geomagnetic sensor falls outside said predetermined range.

3. The vehicle-direction detecting apparatus according to claim 1, wherein said compensation means performs an offset adjustment for said angular velocity sensor when said first discriminating means discriminates that said absolute value signal is greater than said first predetermined value and said second discriminating means discriminates that said output signal of said differentiating means is equal to or smaller than said second predetermined value.

4. The vehicle-direction detecting apparatus according to claim 1, wherein said compensation means compensates for said predetermined range when said first discriminating means discriminates that said absolute value signal is equal to or smaller than said first predetermined value and said value of said XY output signal of said geomagnetic sensor falls outside said predetermined range.

* * * * *